US012448192B2

(12) United States Patent
Moss

(10) Patent No.: US 12,448,192 B2
(45) Date of Patent: Oct. 21, 2025

(54) PACKAGING FOR PILLS

(71) Applicant: Rhiannon Moss, Dubai (AE)

(72) Inventor: Rhiannon Moss, Dubai (AE)

( * ) Notice: Subject to any disclaimer, the term of this patent is extended or adjusted under 35 U.S.C. 154(b) by 0 days.

(21) Appl. No.: 18/432,422

(22) Filed: Feb. 5, 2024

(65) Prior Publication Data

US 2025/0250084 A1 Aug. 7, 2025

(51) Int. Cl.
*B65D 75/36* (2006.01)
*A61J 1/03* (2023.01)

(52) U.S. Cl.
CPC .............. *B65D 75/36* (2013.01); *A61J 1/035* (2013.01)

(58) Field of Classification Search
CPC .. A61J 1/03; A61J 1/035; B65D 75/36; B65D 83/04
USPC .................................................. 206/528–540
See application file for complete search history.

(56) References Cited

U.S. PATENT DOCUMENTS

| | | | | |
|---|---|---|---|---|
| 7,810,640 B2 * | 10/2010 | Weston | B65D 5/5023 | 206/538 |
| 11,648,176 B2 * | 5/2023 | Marshall | B65D 83/0463 | 206/532 |
| 2010/0213097 A1 * | 8/2010 | Paliotta | B65D 73/0092 | 206/532 |

* cited by examiner

*Primary Examiner* — Bryon P Gehman
(74) *Attorney, Agent, or Firm* — Sam Pierce

(57) ABSTRACT

A packaging for tablets, comprising: a central rectangular panel; a first appendage attached at a first scored line to the central rectangular panel; a second appendage attached at a first scored line to the central rectangular panel; a third appendage attached at a first scored line to the central rectangular panel; a fourth appendage attached at a first scored line to the central rectangular panel; wherein each of the first appendage, second appendage, third appendage, and fourth appendage is configured to fold over the central rectangular panel at the respective first scored line; wherein each of the first appendage, second appendage, third appendage, and fourth appendage has a second scored line segmenting the each of the first appendage, second appendage, third appendage, and fourth appendage into a proximal portion and a distal portion.

2 Claims, 4 Drawing Sheets

PACKAGING FOR PILLS

BACKGROUND

Methods and devices for packing pills are known in the prior art patent literature.

For example, U.S. Pat. No. 10,610,450 discloses a container for storage of a medicament, the container comprising a surface having at least one cavity configured to store at least one dose of the medicament; and a covering disposed over at least the cavity of the surface and comprising at least two adjacent edges and a set of perforations disposed on the covering and spaced apart from the at least two adjacent edges of the covering. The surface can have a plurality of cavities therein to store the medicament. The cavity is covered and perforations can be in the surface and the covering in a diagonal. There is a crease adjacent to the diagonal perforations. When the user tears along the perforations that are diagonal to the edges, a triangular piece is pulled apart from the container exposing a tab where the crease is. The user then tears along this tab in the direction of the crease; this force then tears the surface and the covering to dispense the medication.

EP3277247 discloses a pharmaceutical packaging including a plurality of recesses arranged to receive individual doses of medicament, a hermetically sealing layer sealing each of said recesses, and a plurality of hinged portions, each hinged portion associated with a recess. Each hinged portion is selectively movable between a first position adjacent said hermetically sealing layer and a second position in which the hermetically sealing layer is exposed.

Nonetheless, prior art methods and devices do not efficiently package two tablets, among other limitations.

SUMMARY OF INVENTION

Therefore, among the novelties of the present invention is packaging for two tablets individually which promotes hygiene and allows users to take only the required dosage without exposing the remaining tablets to potential contamination.

According to one aspect of the present invention disclosed herein, there is provided a packaging for tablets, comprising: a central rectangular panel; a first appendage attached at a first scored line to the central rectangular panel; a second appendage attached at a first scored line to the central rectangular panel; a third appendage attached at a first scored line to the central rectangular panel; a fourth appendage attached at a first scored line to the central rectangular panel; wherein each of the first appendage, second appendage, third appendage, and fourth appendage is configured to fold over the central rectangular panel at the respective first scored line; wherein each of the first appendage, second appendage, third appendage, and fourth appendage has a second scored line segmenting the each of the first appendage, second appendage, third appendage, and fourth appendage into a proximal portion and a distal portion; and wherein the distal portion of each of the first appendage, second appendage, third appendage, and fourth appendage is configured to fold over the proximal portion.

DETAILED DESCRIPTION

Instead of traditional blister packs with multiple tablets, the present invention discloses packaging two tablets individually. This promotes hygiene and allows users to take only the required dosage without exposing the remaining tablets to potential contamination.

The present invention incorporates technology into the packaging, including QR codes and NFC tags. Users can scan these codes with their smartphones to access information about the medication, including usage instructions, side effects, and expiration dates.

The present invention uses eco-friendly materials for packaging, promoting environmental responsibility. This can include biodegradable or recyclable materials, reducing the environmental impact of pharmaceutical packaging.

The present invention makes the packaging more compact and portable. This not only saves space but also enhances convenience for users who may need to carry the medication with them.

The present invention presents information on the packaging in a clear and user-friendly manner. It includes pictograms, color-coding, and simple language to improve understanding, especially for users with limited health literacy.

The present invention incorporates visible tamper-evident features to ensure the integrity of the medication. This provides users with confidence that the medication has not been compromised.

The present invention enhances the seal of the packaging to prevent air and moisture ingress, ensuring the stability and effectiveness of the medication over time.

Figure 1:
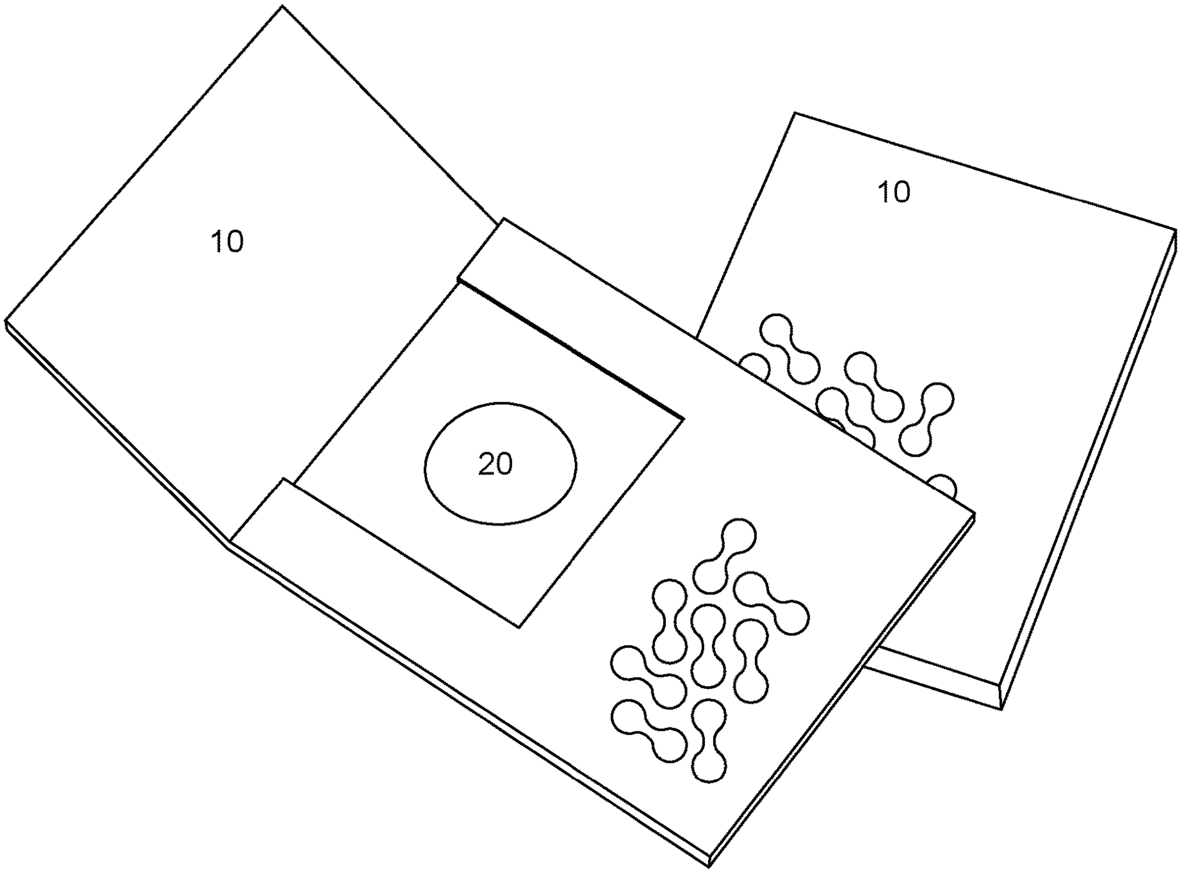
FIG. 1 illustrates packaging for a pair of tablets according to the present invention in open and closed configuration.

FIG. 1 illustrates packaging for a pair of tablets according to the present invention in open and closed configuration.

Packaging 10 is configured for holding, in a preferred embodiment, two tablets of medicine 20.

The primary purpose of the new design is to provide users with a more convenient and safer option for pain relief.

Traditional blister packs expose multiple tablets at once, increasing the risk of contamination. The individualized packaging of each tablet minimizes this risk, promoting hygiene and ensuring the integrity of each dose.

The packaging of the present invention is aimed at promoting individualized dosing, reducing the risk of contamination and ensuring proper medication adherence.

Figure 2:
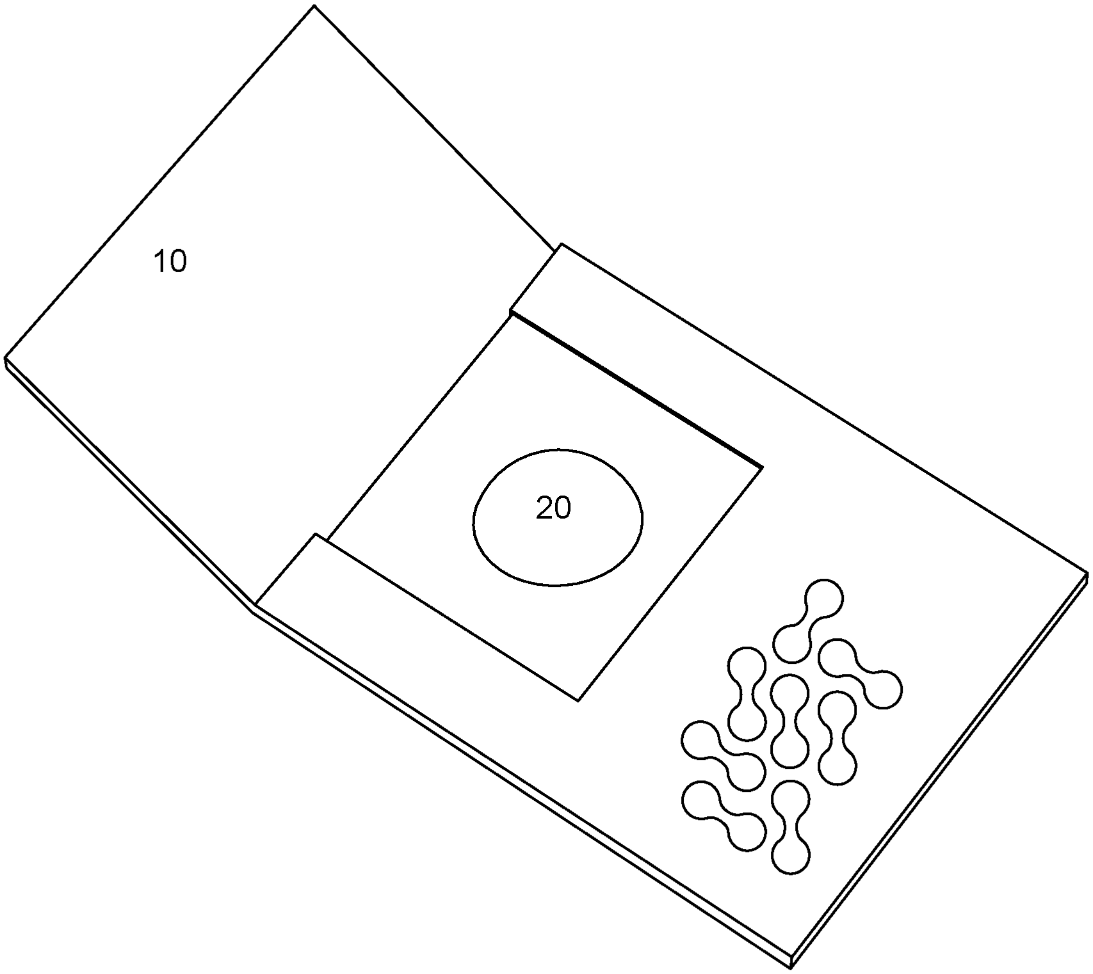
FIG. 2 illustrates packaging in open configuration.

FIG. 2 illustrates packaging 10 in open configuration holding, in a preferred embodiment, two tablets of medicine 20.

Users would find the individualized packaging more user-friendly, allowing for easy access to the medication without the need to handle multiple tablets at once.

Features such as child-proof mechanisms and compact design contribute to a positive and secure user experience.

Tamper-evident and improved sealing features ensure the integrity of the medication, assuring users of its safety and efficacy.

Figure 3:
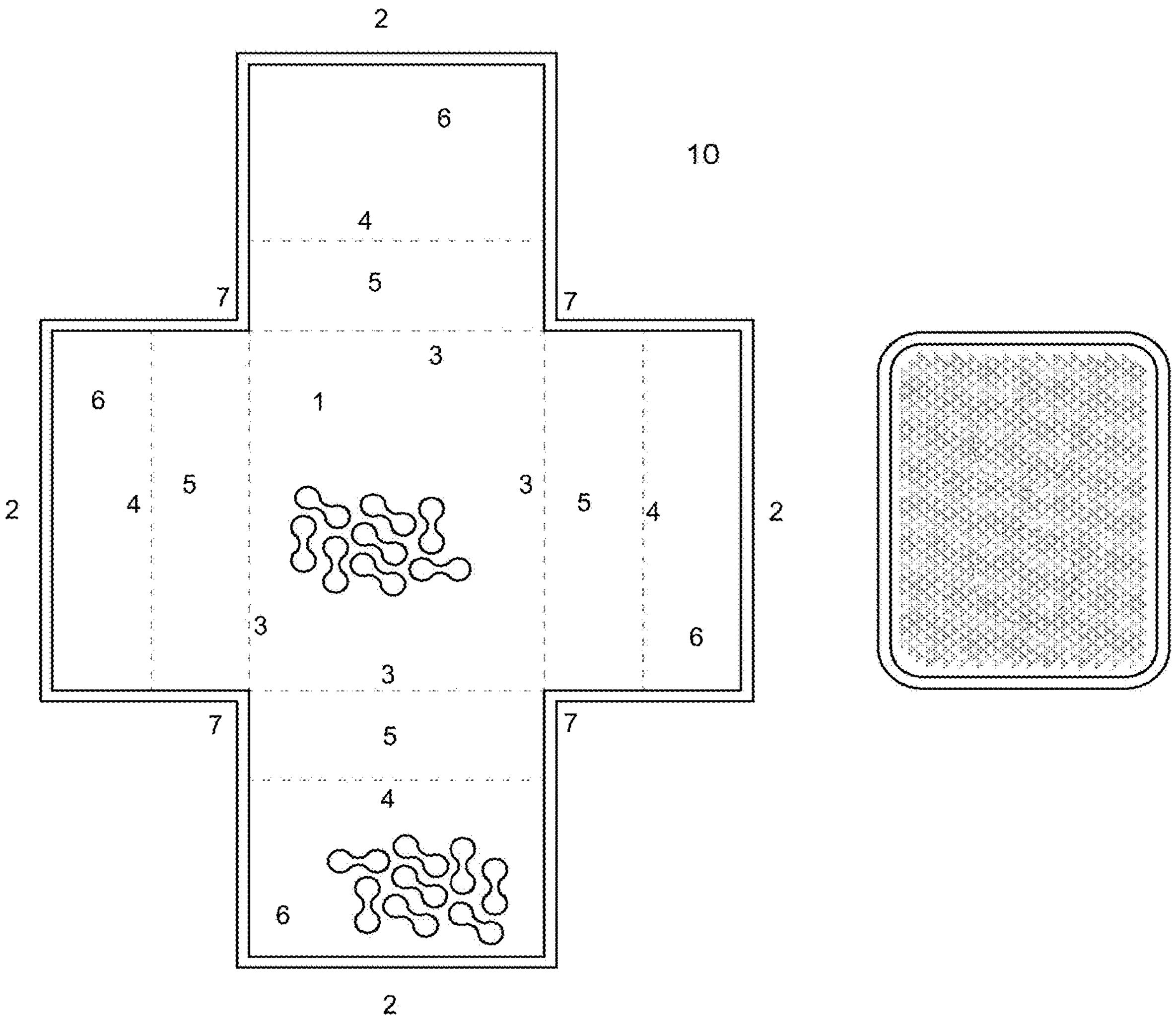
FIG. 3 illustrates the layout and assembly of the packing according to the present invention.

FIG. 3 illustrates the layout and assembly of the central rectangular panel 1, the appendages 2, the first scored lines 3, the second scored lines 4, the proximal portions 5, the distal portions 6 and the fold over relationship of the distal portions 7 according to the present invention.

Packaging 10 consists of an out package with a two-tablet blister pack inside.

A variety material used for the outer package. Paperboard is the most common, and it comes in a range of thicknesses and grades depending on the product.

Paperboard is a grade of fiberboard specially manufactured to withstand creasing. In other words, it will bend or fold without cracking. It's often smoothed and coated to give it a superior printing surface.

Paperboard is made primarily of cellulose fiber derived directly from trees (virgin stock) or waste paper products for recycled content (recycled fibers). Paperboard is generally distinguished from paper primarily based on thickness. Most mills classify paperboard as any thickness exceeding 10-point or 12-point, expressed in thousandths of an inch and measured with a caliper.

The more common types of paperboard include Solid Bleached Sulfate (SBS), which refers to paperboard composed of fully bleached virgin pulp (sulfate process) fiber with a clay coating on one or both sides. Bleaching the pulp fibers provides an appealing, high brightness. Recycled paperboard generally used in printed folding cartons is clay coated on one side, which provides a relatively smooth surface for print, and the uncoated side will appear gray or brown, depending on the fibers used.

Common Grades are SBS—Solid Bleached Sulfate, coated on one-side (C1S) or coated on two sides (C2S); CUK-Coated Unbleached Kraft. No less than 80% virgin fiber; CNK—Coated Natural Kraft, coated on one-side with a kraft back; SUS—Solid Unbleached Sulfate, coated on one-side with a kraft back; CRB—Coated Recycled Board, coated on one-side (C1S) with a kraft back; CCNB—Clay Coated News Back will appear either tan or gray back (depending on the fiber used), clay coated front (C1S); URB—Uncoated Recycled Board, uncoated on two sides; and TMP—Thermal Mechanical Pulp, coated on one-side (C1S). TMP is composed of middle layers of mechanical pulp sandwiched between outer layers of chemical pulp. The top layer is bleached and pigment coated. The back of the paperboard is cream in color. This is because the back layer of bleached or unbleached chemical pulp is translucent, allowing the color of the middle layers to influence the appearance.

There are specialty paperboards that are laminated with silver Mylar, rainbow holographics, and patterned foils.

Grain is the longitudinal arrangement of the fibers in paper or paperboard when they settle in the same direction as the travel of the paper or board machine. A clean, crisp score is achieved by creasing across and not with the grain.

Stiffness is one of the most important properties of paperboard. Stiffness provides strength and reduces the propensity of the packaging.

Packaging 10 on the reverse side has the integration of smart packaging features, such as QR codes or NFC tags, offering instant access to crucial details like usage instructions and expiration dates.

Figure 4:
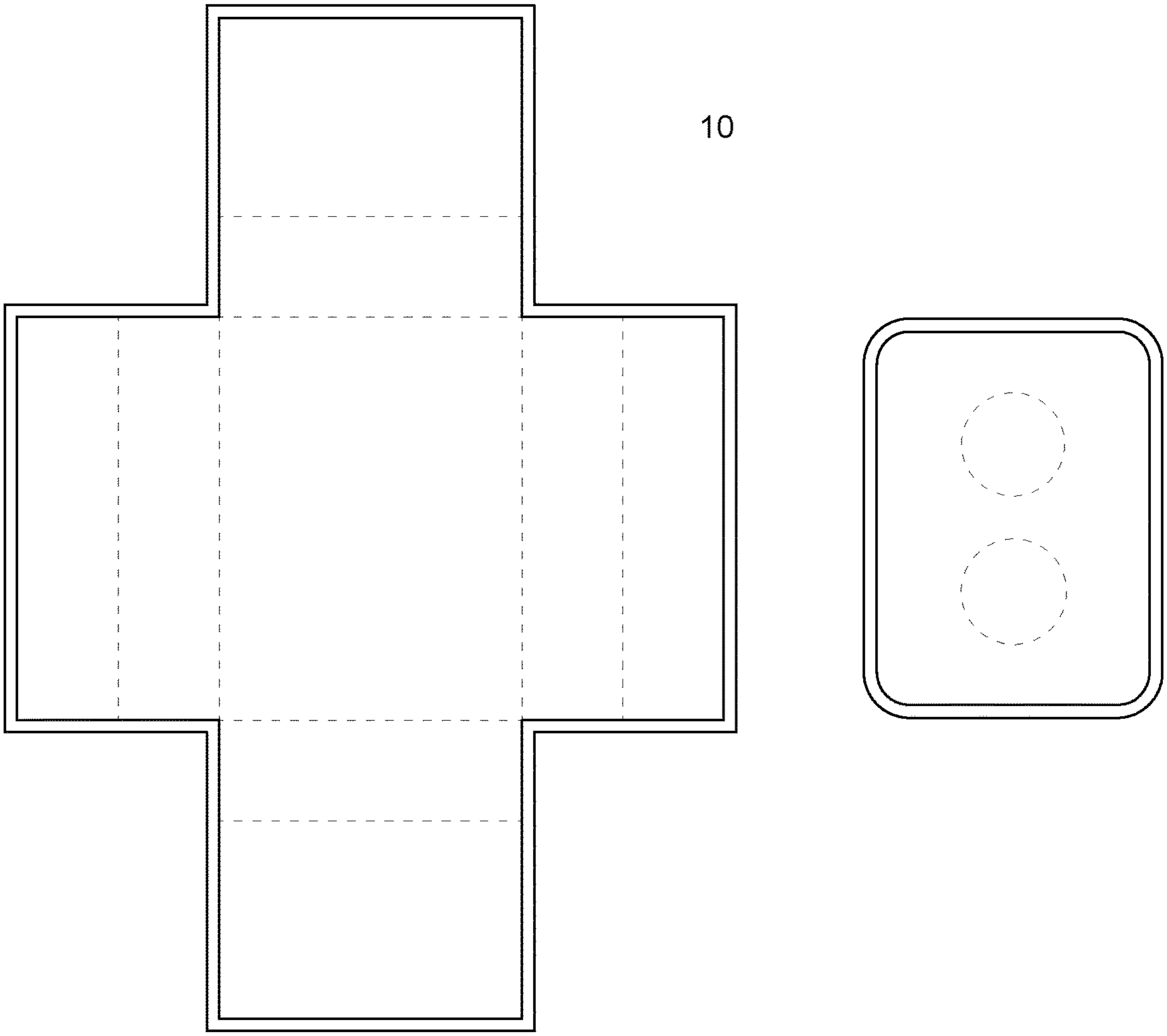
FIG. 4 illustrates the empty layout and assembly of the packing according to the present invention.

FIG. 4 illustrates the empty layout and assembly of the packing according to the present invention.

Packaging 10 consists of a sheet having a central rectangle and appendages on each of four sides scored in the middle of the appendage and scored also at the edge of the central rectangle.

Scoring cardboard refers to compressing the internal support system of the material without creating a cut. The following types are possible.

Crease Score (A.K.A. Bar Score)

A crease, or bar, score is a controlled line of weakness created by depressing a round-head steel rule into the paperboard, typically from a fold line with an unbroken outer surface.

Cut Score (A.K.A. Half Score)

Cut score (or half score) is an alternate type of fold line to the crease score, cut approximately 50% through from the outer (clay) surface. Cut scores fold easily and cleanly, but interior fibers are exposed in the folded state. Cut scores are frequently incorporated into opening features—i.e., double cut score—or in combination with a perforation type line of weakness to control accidental top surface delamination.

Perforation

Perforation is a line of weakness composed of intermittent cuts and spaces that's used as the primary type of scoring for reverse folding paperboard. Perforation may also be incorporated into various types of tear strips or opening features.

Reverse Cut Score

A reverse cut score is an alternative to the perforation as a means of reverse folding paperboard, cutting approximately 50% through from the inside of the paperboard sheet.

Double Cut Score

In a double cut score, pairs of offset and parallel cuts go approximately 50% through opposite sides of the paperboard sheet. It is commonly used as an element of a tear strip or incorporated into an opening feature.

Cut & Crease Score

A cut and crease score is an alternative to the crease score or cut score for forming a folding type line of weakness. It presents less resistance to folding than the conventional crease score and is less prone to accidental top surface delamination than the cut score. Because the top surface is interrupted by cuts, this technique is generally limited to internal scores The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A packaging for tablets, comprising:

a central rectangular panel;

a first appendage attached at a first scored line to the central rectangular panel;

a second appendage attached at a first scored line to the central rectangular panel;

a third appendage attached at a first scored line to the central rectangular panel;

a fourth appendage attached at a first scored line to the central rectangular panel;

wherein each of the first appendage, second appendage, third appendage, and fourth appendage is configured to fold over the central rectangular panel at its respective first scored line;

wherein each of the first appendage, second appendage, third appendage, and fourth appendage has a second scored line segmenting the each of the first appendage, second appendage, third appendage, and fourth appendage into a proximal portion and a distal portion; and wherein the distal portion of each of the first appendage, second appendage, third appendage, and fourth appendage is configured to fold over the proximal portion.

2. The packaging for tablets of claim 1, wherein a blister pack containing tablets is enclosed by the first appendage, second appendage, third appendage, and fourth appendage folding over the central rectangular panel at its respective first scored line and the distal portion of each of the first appendage, second appendage, third appendage, and fourth appendage folding over the proximal portion.

* * * * *